Dec. 29, 1942.  H. C. CLAY  2,306,541

FLOATING HYDRAULIC CONTROL

Filed March 6, 1939  3 Sheets-Sheet 1

INVENTOR.

Harry C. Clay,

BY Hood & Hahn.

ATTORNEYS.

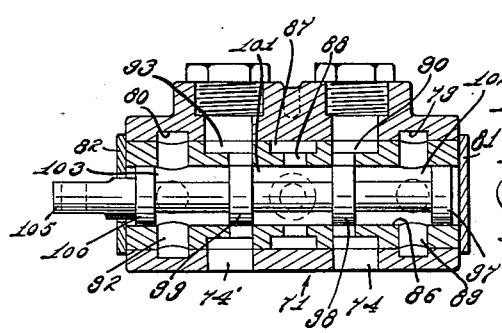
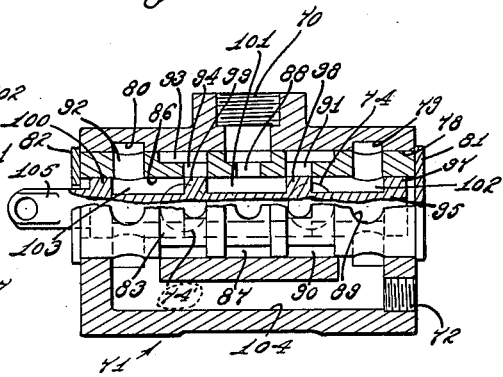
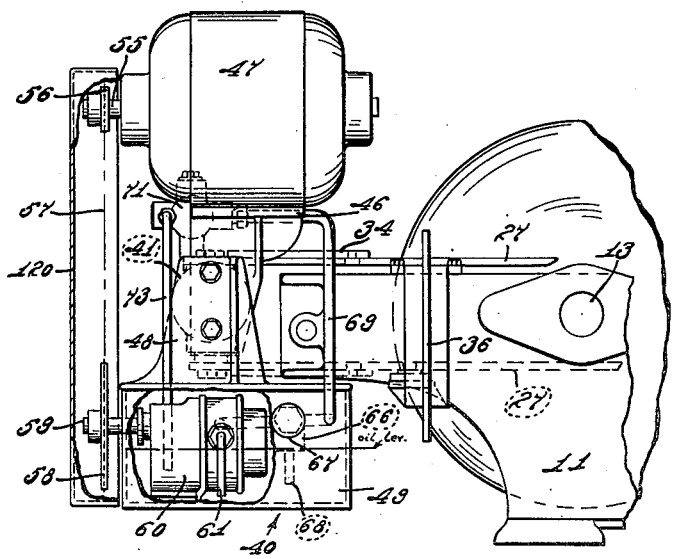

Dec. 29, 1942. H. C. CLAY 2,306,541
FLOATING HYDRAULIC CONTROL
Filed March 6, 1939 3 Sheets-Sheet 3

INVENTOR.
Harry C. Clay,
BY Hood & Hahn.
ATTORNEYS.

Patented Dec. 29, 1942

2,306,541

UNITED STATES PATENT OFFICE 2,306,541

FLOATING HYDRAULIC CONTROL

Harry C. Clay, Columbus, Ind., assignor to Reeves Pulley Company, Columbus, Ind., a corporation of Indiana Application March 6, 1939, Serial No. 260,129

14 Claims. (Cl. 60—52)

The present application relates to a floating hydraulic control, primarily intended for application to variable speed transmissions of the "Reeves" type. While it is illustrated in connection with such a transmission, it is to be understood that it may be applied to other uses; and that the structure disclosed in the present application, when so applied to other uses, comes within the scope of my invention.

While hydraulic controls of various types have heretofore been applied to a variable speed transmission of the Reeves type, it is the primary object of the present invention to provide a hydraulic control of a sort which has not heretofore been adapted to such a use, and to associate such a control in a novel manner with the shiftable elements of the transmission, thereby providing a combination which, while very simple, achieves an accuracy and delicacy of control not heretofore obtainable with such simple mechanism. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 3 is a fragmentary side elevation viewed from the top of Fig. 1, parts being broken away for clarity;

Fig. 4 is a longitudinal section through the valve mechanism forming a part of the invention;

Fig. 5 is a similar section through the valve mechanism, but taken upon a plane 90 degrees removed from that of Fig. 4;

Figure 1:
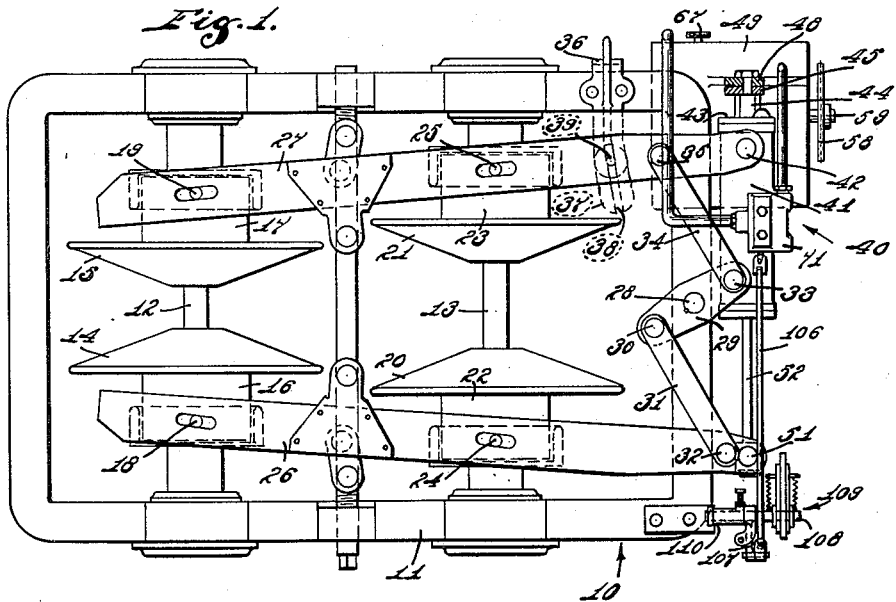
Fig. 1 is a plan of a Reeves variable speed transmission with a control of the present application applied thereto, certain parts being broken away for clarity of illustration.
Figure 2:
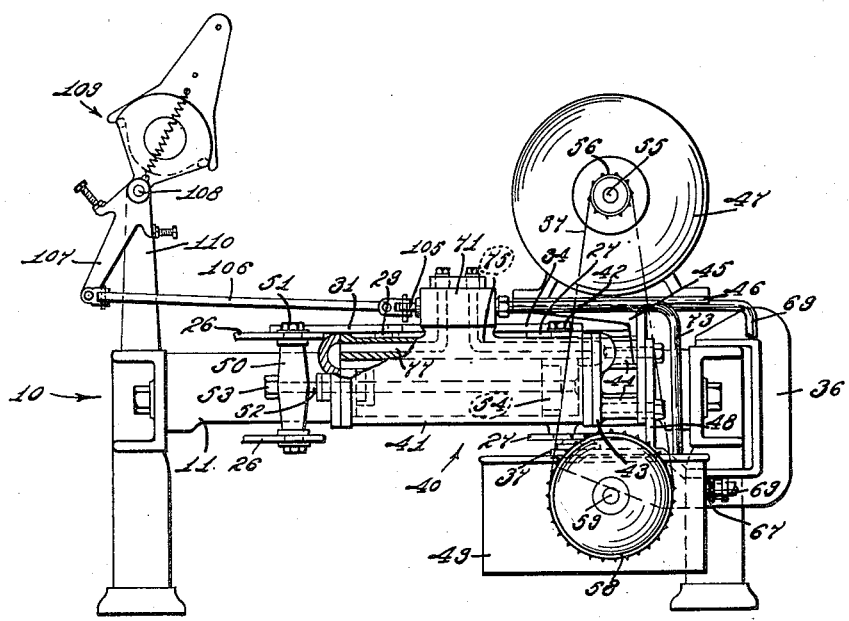
Fig. 2 is an end elevation of the above mechanism, viewed from the right of Fig. 1, certain parts being shown in section.

Referring more particularly to Figs. 1 and 2, it will be seen that I have illustrated a variable speed transmission of the Reeves type, indicated generally by the reference numeral 10, and comprising a rectangular frame 11 in which are journaled parallel shafts 12 and 13. Slidably mounted upon the shaft 12 are two mating coned discs 14 and 15, the disc 14 being provided with a thrust bearing 16 and the disc 15 being provided with a thrust bearing 17. Pins 18 project diametrically from the thrust bearing 16 and pins 19 project diametrically from the thrust bearing 17. Similarly, two coned mating discs 20 and 21 are slidably mounted upon the shaft 13, the disc 20 being provided with a thrust bearing 22 and the disc 21 being provided with a thrust bearing 23. The thrust bearing 22 is provided with diametrically projecting pins 24 and the thrust bearing is provided with diametrically projecting pins 25.

A pair of shift levers 26 have slotted connections with the pins 18 and 24 and are suitably pivotally mounted between the points of engagement with said pins. Similarly, a pair of shift levers 27 have slotted connections with the pins 19 and 25 and are suitably pivotally mounted between the points of engagement with said pins. The manner in which the shift levers 26 and 27 are mounted is standard practice and is well known in the prior art. Obviously, if the right-hand ends of the levers 26 and 27 are brought closer to each other, the effective diameter of engagement of a V-belt between the discs 20 and 21 will be increased and the effective diameter of engagement of said belt between the discs 14 and 15 will be decreased, whereby the speed ratio of the transmission will be varied.

Pivotally mounted at 28 upon the frame 10 is a lever 29 to one end of which is pivoted, as at 30, one end of a link 31, the opposite end of which is pivoted as at 32 to the projecting ends of the lever pair 26. To the other end of the lever 29 is pivoted, as at 33, one end of a link 34 the other end of which is pivoted, as at 35, adjacent the projecting ends of the lever pair 27. The mechanism 28—35 constitutes an equalizing linkage enforcing substantially equal and opposite movement of the lever pairs 26 and 27. That is, movement of the lever pair 26 in one direction must necessarily be accompanied by substantially equal movement of the lever pair 27 in the opposite direction, because of the linkage 28—35.

A C-bracket 36 is suspended from the frame 11 and is formed with a projecting arm 37 which is disposed beneath, and supports, the lever pair 27, said arm 37 being slotted as at 38 for the reception of a guide pin 39 carried by the lowermost of said levers 27. The presence of the C-bracket with its supporting arm 37 is made desirable because of the weight of the shifter unit, indicated generally by the reference numeral 40, which is carried upon the lever pair 27. While the structure would be operative even in the absence of the C-bracket 36 and its arm 37, it would be less sensitive because of possible binding of the lever pair 27 due to the twisting effect of the weight of the unit 40.

The unit 40 comprises a hydraulic cylinder 41 supported between the levers 27 and pivotally associated therewith as at 42, for movement with said lever pair. One end of said cylinder is closed by a head 43 which is provided with two studs 44 projecting axially from the cylinder 41, and forming a mounting for a bracket 45 supporting a platform 46 upon which is mounted an electric motor 47. Said studs 44 likewise form a mounting for a depending bracket 48 supporting a fluid reservoir 49. Common bolts pass through the brackets 48 and 45 and into the studs 44 to secure said brackets in place; and, if desired, said bolts may likewise constitute the means for securing the head 43 in place upon the cylinder 41.

A swivel element 50 is pivotally connected as at 51, between the levers 26; and is provided with a transverse bore receiving a piston rod 52, said rod being secured in place by a nut 53 or the like. As is clearly to be seen in Fig. 2, said piston rod is connected to a piston 54 reciprocally received within the cylinder 41.

Figure 7:
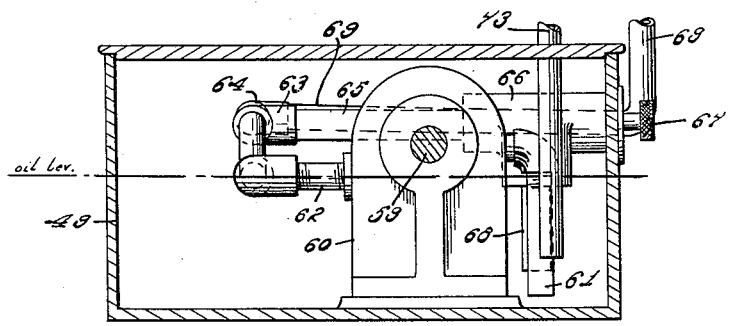
Fig. 7 is an enlarged sectional view through the fluid reservoir, showing the pump and piping arranged in said reservoir.

Upon the spindle 55 of the motor 47 is mounted a sprocket 56, driving, through a chain 57, a sprocket 58 mounted upon a shaft 59 which, as will be clearly seen in Figs. 3 and 7, constitutes the driving shaft for a pump 60, which, in the illustrated embodiment of the invention is a centrifugal pump.

The pump 60 is mounted within the reservoir 49, and preferably the reservoir 49 is filled with oil to the level indicated by the broken lines in Figs. 3 and 7. A pipe 61 has its intake disposed adjacent the bottom of the reservoir 49 and is connected to the intake port of the pump 60. The discharge port of said pump is connected, by a pipe 62, with one branch of a T-fitting 63, the other branch of which is connected to an elbow 64. The stem of the T 63 is connected by a pipe 65 with a pressure relief valve 66 which is adjustable through the medium of a knurled knob 67 disposed outside the reservoir 49. The motor 47 constantly drives the pump shaft 59, and at times when there is no call for a variation in the transmission ratio, liquid will circulate through the pump and T 63 past the pressure relief valve 66, being returned to the reservoir through the discharge pipe 68.

From the elbow 64, a pipe 69 leads to the inlet port 70 (Fig. 5) of a control valve 71 mounted upon the cylinder 41 and controlling the flow of fluid under pressure from the pump 60 to the cylinder 41, and the return of such fluid from the cylinder to the reservoir 49. The outlet port 72 of the valve 71 is connected, by a pipe 73 with the interior of the reservoir 49. (See Figs. 1, 3 and 7.)

The valve housing 71 is provided with a port 74 leading from the interior of said housing and communicating with a passage 75 formed in the cylinder 41 and leading to the right-hand end of said cylinder, as is clearly shown in Fig. 2. Said valve housing is formed with a second port 74' communicating with a passage 77 in the cylinder wall and leading to the left hand end of said cylinder.

The control valve mechanism is illustrated in detail in Figs. 4 and 5; and, in the consideration of those figures, it is to be remembered that Fig. 4 is taken upon a vertical plane, while Fig. 5 is taken upon a horizontal plane. Said housing is formed with an axial bore 78, and with an internal groove 79 adjacent one end and an internal groove 80 adjacent the opposite end, said grooves communicating with a passage 104 from which opens the outlet port 72. The ends of said bore 78 are closed by caps 81 and 82, respectively, and positioned within the bore 78 is a valve cage 83 which snugly fits within the bore 78 and is, in turn, formed with an axial bore 86.

The valve cage 83 is centrally formed with an external peripheral groove 87 communicating with the inlet port 70; and a peripheral series of ports 88 provide communication between said groove 87 and the bore 86. Near one end, said cage is provided with a peripheral series of ports 89 providing communication between the groove 79 and the cage bore 86. At a point between the groove 87 and the ports 89, said valve cage is formed with an external peripheral groove 90 communicating, through a port 91, with the interior of the bore 86.

Adjacent its opposite end, the valve cage is formed with a peripheral series of ports 92 providing communication between the bore 86 and the groove 80; and, at a point between the groove 87 and the ports 92, said cage is formed with an external peripheral groove 93 communicating, through a port 94, with the interior of the bore 86.

Reciprocably mounted within the bore 86 is a valve 95 of the piston type formed with peripheral lands 97, 98, 99, and 100 defining peripheral passages 101, 102, and 103. Said valve 95 is formed with a stem 105 projecting from one end of the valve housing.

As is clearly to be seen in Figs. 4 and 5, when the valve 95 is in its intermediate position, there is no passageway for the flow of fluid from the pocket 101 which communicates, through the port 88 and groove 87, with the inlet port 70 of the valve housing. Likewise, when the valve is in its intermediate illustrated position, there is no connection between the ports 74 and 74' on the one hand and either the inlet port 70 or the outlet passage 104, on the other hand.

If the valve 95 is shifted slightly to the right from the position illustrated, fluid may flow from the inlet port 70 through the groove 87 and port 88 into the pocket 101 and thence, through the port 91 and groove 90 to the port 74, whence it will flow, through passage 75, to and into the right-hand end of the cylinder 41, tending to force relative movement of the piston 54 and cylinder 41. Simultaneously, a path is provided for liquid to flow from the left-hand end of the cylinder, through passage 77, port 74', groove 93, port 94, pocket 103, ports 92, and groove 80 to and through outlet passage 104 and the outlet port 72. Because of the peculiar mounting of the shifter mechanism, the relative movement between the piston 54 and cylinder 41 will cause actual movement of both of those elements, the piston 54 moving toward the left and the cylinder 41 moving toward the right. Obviously, if the valve 95 is not further moved, such movement of the cylinder 41 toward the right, necessarily carrying with it the valve housing 71, will return the valve parts to the intermediate positions illustrated in Figs. 4 and 5, thereby cutting off all flow of fluid to and from the cylinder 41, and stopping further relative movement between the cylinder and piston.

As is most clearly to be seen in Figs. 1 and 2, a link 106 is connected at one end to the valve stem 105 and at its opposite end to a lever 107 mounted upon a rock shaft 108 to which is likewise connected a safety shifter indicated generally by the reference numeral 109, and of well known characteristics. The rock shaft 108 is suitably mounted upon a standard 110 supported upon the frame 11. Movement of the shifter mechanism 109 in either direction to any degree will result from movement of the valve 95 in a corresponding direction to a corresponding degree; and such movement, in turn, will result in movement of the cylinder 41 in the same direction and to the same degree, the piston 54 simultaneously moving in the opposite direction to the same degree.

While I prefer the organization of Figs. 1 and 2 for its compactness, there may be occasions upon which it will be desirable to separate the motor 47 and the reservoir 49 with its contained mechanism from the transmission. In that case, the organization will be constructed in the manner illustrated in Fig. 6 in which a motor 111 having a sprocket 113 drives, through a chain 114, a sprocket 115 on the pump shaft 116. The reservoir 112 will be in all respects similar to the reservoir 49; and the mechanism contained in said reservoir will be the same. Fluid will be supplied from the reservoir through a supply hose 117 to the inlet port of the valve mechanism 118, which will be in all respects similar to the valve mechanism of Figs. 1 to 5, and fluid will be conducted from said valve mechanism 118 to the reservoir through a flexible hose 119. While I have shown the motor and reservoir closely adjacent the transmission, it will be obvious that they may be spaced any reasonable distance from each other. In other respects, the organization of Fig. 6 is identical with that of Figs. 1 and 2.

Figure 6:
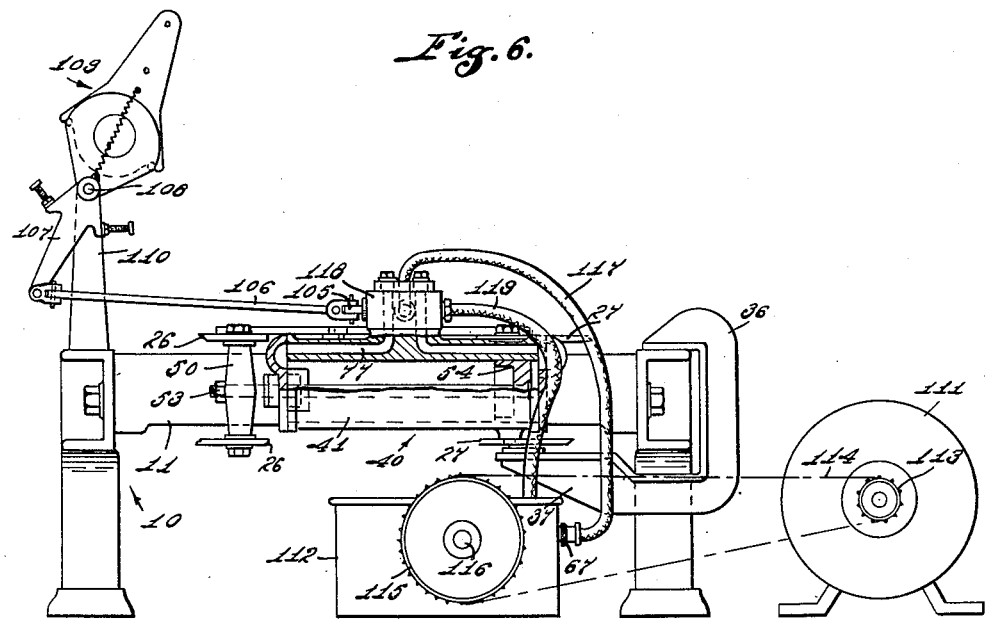
Fig. 6 is a view similar to Fig. 2, but showing a modified form of the invention.

If desired, the chain guard 120 may be provided to guard the chain 57 and its associated sprockets 56 and 58; and if desired a similar guard may be provided to guard the chain 114 of Fig. 6.

I claim as my invention:

1. For use with a variable speed transmission having two levers oppositely movable simultaneously to effect variations in the speed ratio of said transmission, and means operatively connected with said levers to enforce such opposite simultaneity of movement, a fluid motor comprising a cylinder supported upon and movable with one of said levers, a piston reciprocably received in said cylinder and having an operative connection with the other of said levers, a source of fluid under pressure, and means for controlling fluid flow to and from opposite ends of said cylinder.

2. For use with a variable speed transmission having two levers oppositely movable simultaneously to effect variations in the speed ratio of said transmission, and means operatively connected with said levers to enforce such opposite simultaneity of movement, a fluid motor comprising a cylinder and a piston reciprocably received in said cylinder, one of said motor elements being supported upon and movable with one of said levers and the other of said motor elements having an operative connection with the other of said levers, a source of fluid under pressure, and means for controlling fluid flow to and from opposite ends of said cylinder.

3. For use with a variable speed transmission having a frame and two members relatively movable to effect variations in the speed ratio of said transmission, a fluid motor comprising a cylinder and a piston reciprocably received in said cylinder, one of said motor elements being supported upon and movable with one of said transmission members and the other of said motor elements having an operative connection to move with the other of said transmission members, a source of fluid under pressure, and means for controlling fluid flow to and from opposite ends of said cylinders, comprising a valve housing carried by said cylinder and having ports communicating with opposite ends of said cylinder, a valve movably mounted in said housing for controlling said ports, and means providing an adjustable connection between said valve and said frame.

4. For use with a variable speed transmission having a frame and two members relatively movable to effect variations in the speed ratio of said transmission, a fluid motor comprising a cylinder and a piston reciprocably received in said cylinder, one of said motor elements being supported upon and movable with one of said transmission members and the other of said motor elements having an operative connection to move with the other of said transmission members, a source of fluid under pressure, and means for controlling fluid flow to and from opposite ends of said cylinder, comprising a valve housing carried by said cylinder and having ports communicating with opposite ends of said cylinder, a valve movably mounted in said housing for controlling said ports, a shift lever mounted on said frame, and means providing an operative connection between said valve and said shift lever.

5. For use with a variable speed transmission having a frame and two members relatively movable to effect variations in the speed ratio of said transmission, a fluid motor comprising a cylinder and a piston reciprocably received in said cylinder, one of said motor elements being supported upon and movable with one of said transmission members and the other of said motor elements having an operative connection to move with the other of said transmission members, a source of fluid under pressure, and means for controlling fluid flow to and from opposite ends of said cylinder, comprising a valve housing carried by said cylinder and having ports communicating with opposite ends of said cylinder, a valve movably mounted in said housing for controlling said ports, and means for moving said valve with respect to said housing, and for thereafter holding said valve against movement during movement of said housing with said cylinder.

6. For use with a variable speed transmission including two members relatively movable to effect variations in the speed ratio of said transmission, a fluid motor comprising a cylinder movable with one of said members and a piston reciprocably received in said cylinder and having an operative connection to move with the other of said members, a source of fluid under pressure, and means for controlling fluid flow from said source to opposite ends of said cylinder and for controlling fluid flow from said cylinder, comprising a valve housing movable with said cylinder and having ports communicating with opposite ends of said cylinder, a valve movably mounted in said housing and controlling said ports, and means for moving said valve in one direction to admit fluid to one end of said cylinder and exhaust fluid from the other end thereof and for thereafter holding said valve against movement while movement of said cylinder and housing, consequent upon such fluid admission, returns the valve parts to their previous relative positions.

7. For use with a variable speed transmission having a frame and two members relatively movable to vary the speed ratio of said transmission, a fluid motor comprising a cylinder carried by and movable with one of said members and a piston reciprocably received in said cylinder and operatively connected to the other of said members, a fluid reservoir supported upon said cylinder, a pump within said reservoir, driving means for said pump, conduit means providing communication between said pump and both ends of said cylinder, conduit means providing communication between both ends of said cylinder and said reservoir, and valve means controlling fluid flow through said conduit means to connect one end of said cylinder with said pump and the other end of said cylinder with said reservoir.

8. For use with a variable speed transmission having a frame and two members relatively movable to vary the speed ratio of said transmission, a fluid motor comprising a cylinder carried by and movable with one of said members and a piston reciprocably received in said cylinder and operatively connected to the other of said members, a fluid reservoir supported upon said cylinder, a pump within said reservoir, driving means for said pump, conduit means providing communication between said pump and both ends of said cylinder, conduit means providing communication between both ends of said cylinder and said reservoir, and commonly-controlled valve means controlling fluid flow through all of said conduit means, said valve means in one position providing communication between said pump and one end of said cylinder and between the other end of said cylinder and said reservoir.

9. For use with a variable speed transmission having a frame and two members relatively movable to vary the speed ratio of said transmission, a fluid motor comprising a cylinder carried by and movable with one of said members and a piston reciprocably received in said cylinder and operatively connected to the other of said members, a fluid reservoir supported upon said cylinder, a pump within said reservoir, an electric motor supported upon said cylinder and connected to drive said pump, conduit means providing communication between said pump and both ends of said cylinder, conduit means providing communication between both ends of said cylinder and said reservoir, and valve means controlling fluid flow through said conduit means, said valve means in one position providing communication between said pump and one end of said cylinder and between the other end of said cylinder and said reservoir.

10. For use with a variable speed transmission having a frame and two simultaneously oppositely movable members for varying the speed ratio of said transmission, and means operatively connected with said members to enforce such opposite simultaneity of movement, a shifter unit for said members comprising a cylinder riding upon one of said members, a piston reciprocably received in said cylinder, a piston rod connected to said piston and to the other of said members, a source of fluid under pressure, and means for controlling the flow of fluid to and from opposite ends of said cylinder.

11. For use with a variable speed transmission having a frame and two simultaneously oppositely movable members for varying the speed ratio of said transmission, and means operatively connected with said members to enforce such opposite simultaneity of movement, shifting mechanism for said members comprising a unit riding on one of said members and including a cylinder, a source of fluid under pressure, and means for controlling the flow of fluid from said source to either end of said cylinder while simultaneously relieving the fluid from the opposite end of the cylinder, and a piston connected to the other of said members and reciprocably received in said cylinder.

12. For use with a variable speed transmission having a frame and two simultaneously oppositely movable members for varying the speed ratio of said transmission, and means operatively connected with said members to enforce such opposite simultaneity of movement, shifting mechanism for said members comprising a unit riding on one of said members and including a cylinder, a fluid reservoir, a fluid pump in said reservoir and operable to draw fluid from said reservoir and discharge it under pressure, means for driving said pump, and means for controlling the flow of fluid discharged from said pump to either end of said cylinder while simultaneously relieving the fluid from the opposite end of the cylinder, and a piston connected to the other of said members and reciprocably received in said cylinder.

13. For use with a variable speed transmission having a frame and two simultaneously oppositely movable members for varying the speed ratio of said transmission, and means operatively connected with said members to enforce such opposite simultaneity of movement, a shifter unit for said members comprising a fluid motor including a cylinder movable with one of said members, a piston movable with the other of said members and reciprocably received in said cylinder, a source of fluid under pressure, and means controlling the flow of fluid from such source to either end of said cylinder while simultaneously relieving the fluid from the opposite end of the cylinder and comprising a valve housing movable with one of said fluid motor elements and having ports communicating with opposite ends of said cylinder, and a valve movably mounted in said housing to control said ports, said valve being adjustably connected to said frame.

14. For use with a variable speed transmission having a frame and two simultaneously oppositely movable members for varying the speed ratio of said transmission, a shifter unit for said members comprising a reciprocating motor including two relatively movable parts, one of said parts being connected to move with one of said transmission members and the other of said parts being connected to move with the other of said transmission members, means for moving said motor parts oppositely relative to each other, and an equalizer linkage mounted on said frame and connected to said transmission members for enforcing substantially equal opposite movements thereof under the influence of said motor.

HARRY C. CLAY.